United States Patent Office 3,341,167
Patented Sept. 12, 1967

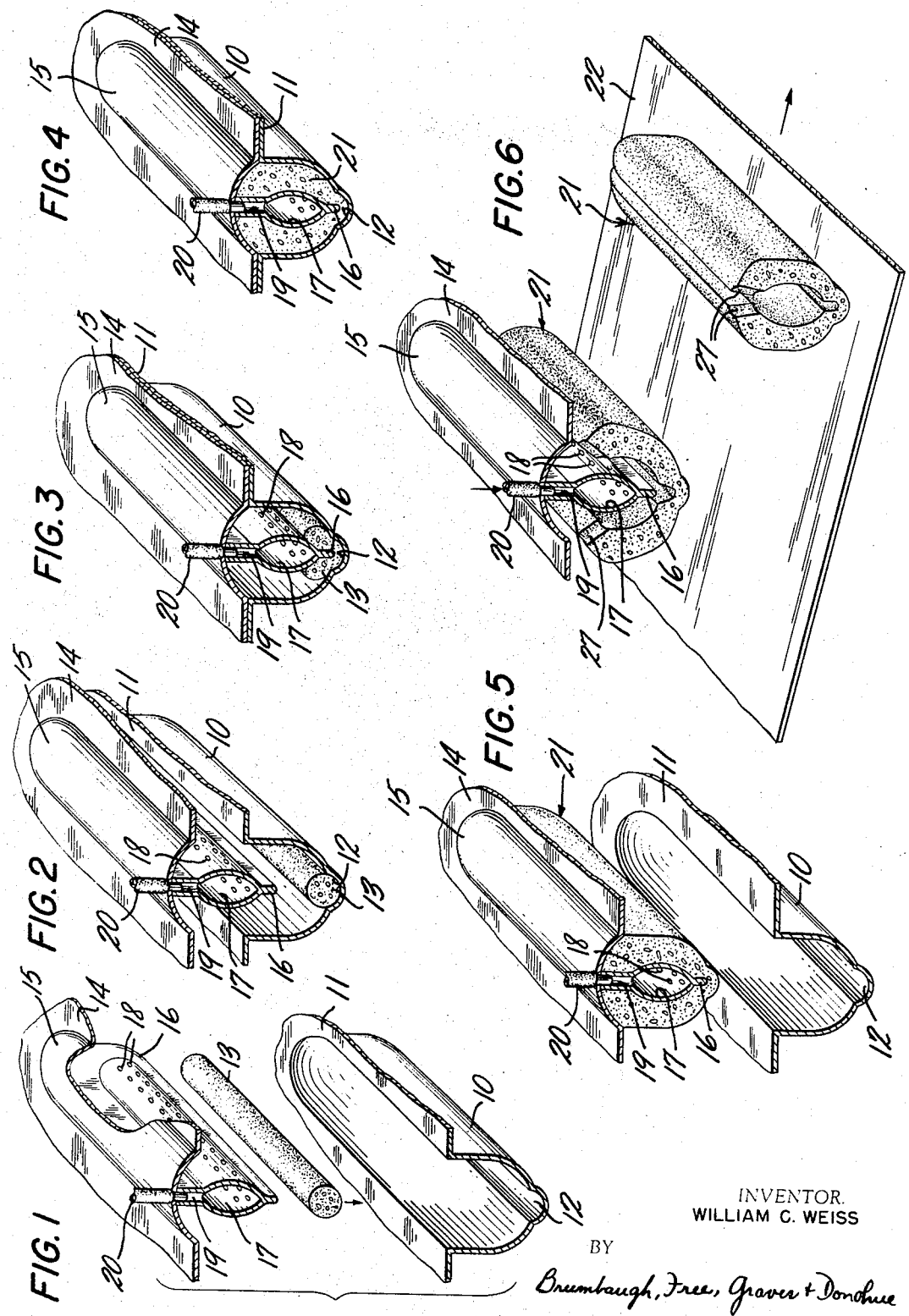

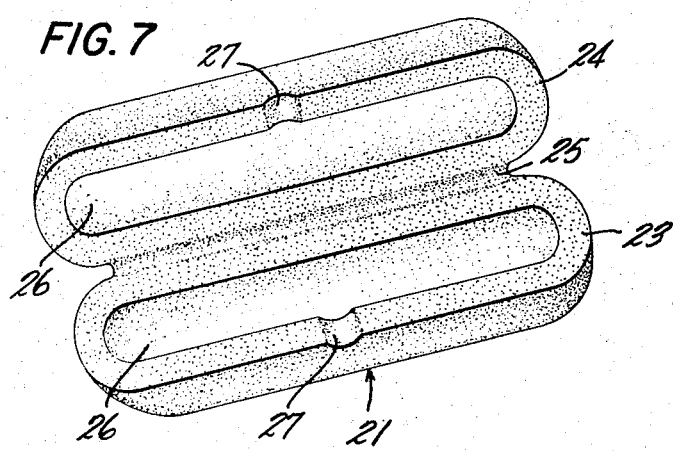
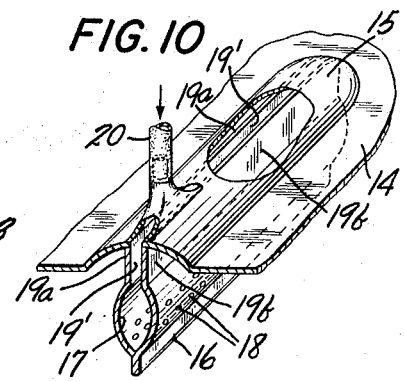
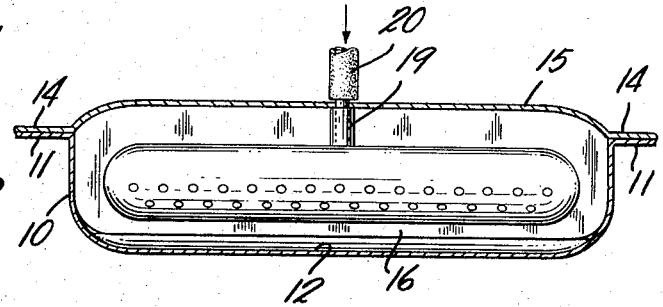
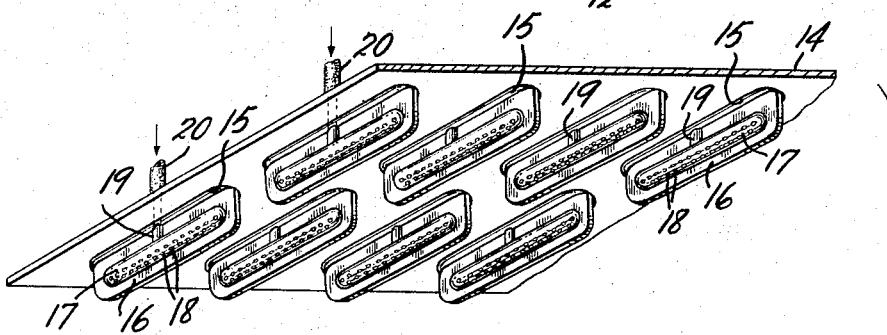
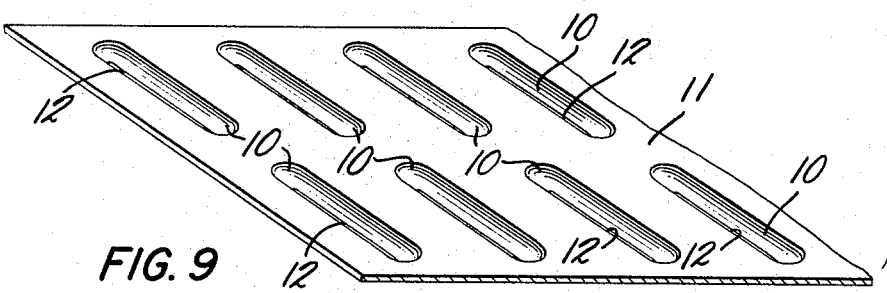

3,341,167
FRANKFURTER BUN BAKING RECEPTACLE
William C. Weiss, R.D. 1, Box 52,
Hershey, Pa. 17033
Filed May 13, 1964, Ser. No. 367,023
4 Claims. (Cl. 249—66)

This invention relates to baking receptacles as well as distinctive forms of baked products and, more particularly, to receptacles for baking frankfurter buns and to the resulting baked buns.

An object of the invention is to provide a receptacle within which one or more baked products such as frankfurter buns may be baked in a novel form and in which form they are more useful in the sale of frankfurters. Such comestible is commonly referred to as a "hot dog" and, in the manner presently sold, the elongated bun, when split, receives the frankfurter, together with its embellishments, which contents cause the bun to be spread apart and awkward to handle.

Another object of this invention is to provide an improved form of bun for use in receiving a frankfurter and so formed that the frankfurter will be received within the bun so that it and other contents of the bun will be more easily handled and consumed.

A further object of the invention is to provide a baking receptacle by means of which the aforementioned bun may be effectively baked.

Yet another object of the invention is to provide a baking receptacle of the above character wherein one or more of the baked buns may be effectively removed from the receptacle after the making operation is completed.

The foregoing and other objects are attained by providing, in the preferred form of the invention, a receptacle formed essentially of two parts. In one part of the receptacle, depressions are formed in the exterior surface shape of the bun ultimately desired. The other part of the receptacle is formed as a closure for the first part and also with means to shape the interior portions of the bun in a desired fashion. In attaining more completely the objects above-mentioned, the baking receptacle is provided with means by which air under pressure may be utilized to dislodge and remove the baked product from the receptacle.

The invention may be better understood from the following description, taken in conjunction with the accompanying drawings, in which:

FIG. 1 is an exploded view in perspective showing a baking receptacle having bottom and top portions and indicating a roll of dough positioned therebetween;

FIG. 2 illustrates the receptacle portions of FIG. 1 in a slightly different position and showing the roll of dough properly positioned within the bottom portion of the receptacle;

FIG. 3 is a view similar to FIGS. 1 and 2 but showing the two portions of the receptacle in a closed position and preparatory to the baking operation;

FIG. 4 is a view similar to FIG. 3 showing the manner in which, during baking, the dough rises into the shape ultimately desired within the baking receptacle;

FIG. 5 is a view similar to FIGS. 1–4 wherein the upper portion of the receptacle has been removed from the lower portion, with the baked bun adhering to the upper portion;

FIG. 6 is a perspective view illustrating the manner in which the baked bun is removed from the upper portion;

FIG. 7 is a detailed view showing the baked bun in perspective;

FIG. 8 is a view in vertical and longitudinal section showing the interior of the receptacle of the present invention;

FIG. 9 is an expanded view illustrating the relationship of the upper and lower portions of a baking receptacle having a multiplicity of cavities and mating portions in order that a plurality of buns may be baked simultaneously; and FIG. 10 is a view in perspective of another embodiment of the upper portion of the receptacle.

Referring to the above drawings, it will be seen that a lower receptacle portion 10 is provided, being formed as a depression from a plate or flange member 11. The bottom of the receptacle is formed with a trough 12 which is to receive a quantity of dough 13. The upper portion or top of the receptacle is illustrated as being formed with a flange or plate portion 14 having an elongated dome-shaped part 15 that registers with the hollow portion 10 of the lower receptacle. Longitudinally of the dome-shaped portion there is provided a fin or flange 16 having formed therein an elongated central cavity 17 provided with a plurality of apertures 18, leaving the peripheral portion of the fin extending outwardly of and surrounding the elongated central cavity (see FIGS. 8 and 9). A duct 19 provides a communication between the cavity 17 and a conduit 20 that is adapted to receive air under pressure from a suitable source (not shown).

The receptacle is used in the following fashion. After the quantity of dough 13 is placed in the trough 12, the upper portion of the receptacle is placed in register with the lower portion, as illustrated in FIG. 3, and the receptacle with its contents is then placed in an oven for the usual baking operation. After the baking is completed (during which the dough rises to fill the receptacle to form the bun 21, as illustrated in FIG. 4), the receptacle parts are separated, as illustrated in FIG. 5, and the upper portion, together with the bun adhering thereto, is placed over a table or conveyor 22, and air under pressure is applied to the cavity 17 through the tube 20, as indicated by the arrow in FIG. 6. This results in dislodging and removing the baked bun from the upper portion of the receptacle, as illustrated in FIG. 6.

It will be observed that the shape of the receptacle, as well as the fin 16, is such that the shape of the bun includes two side portions 23 and 24 (FIG. 7) with a hinge portion 25 integral therewith and uniting them as a single bun. It will be seen that the thickness of the hinge portion is less than that of the side portions. Within each side portion there is formed a longitudinal cavity 26 for receiving the frankfurter, as above-mentioned. In this fashion, the cavities formed in the side portions of the bun permit the bun to be closed about the frankfurter and the resulting product is more conveniently handled.

It will be seen that there is formed in each side portion of the bun a small recess 27 caused by the duct 19. FIG. 10 shows another embodiment of the upper portion of the receptacle, wherein the duct 19' is of elongated shape and is formed with spaced, substantially parallel surfaces 19a and 19b, so that the baked bun (not shown) is free from such small recesses.

Although the invention has been described herein with reference to specific embodiments, many modifications and variations thereof will readily occur to those skilled in the art. Accordingly, all such variations and modifications are included within the intended scope of the invention as defined by the following claims.

I claim:
1. A baking receptacle comprising
   a support for a quantity of material to be baked, said support being elongated and formed with a longitudinal fin,
   an elongated cavity formed in the central portion of the fin and provided with apertures therein, the peripheral portion of the fin extending outwardly of and surrounding the cavity, the central portion of the fin in which the cavity is formed protruding outwardly from the remainder of the fin, means to introduce air under pressure into the cavity, and a co-operating receptacle portion adapted to receive the support and form an enclosure to shape the baked material.

2. A receptacle according to claim 1 wherein the fin is shaped to be spaced from the co-operating receptacle portion to form a hinge in the baked material along one longitudinal edge thereof.

3. A receptacle according to claim 1 wherein the co-operating receptacle portion is formed with a longitudinal groove spaced from and adjacent the edge of the fin when the receptacle portions are assembled.

4. A baking receptacle comprising a rigid support for a quantity of material to be baked, said support being elongated and formed with a longitudinal fin, an elongated cavity formed in the central portion of the fin and provided with apertures therein, the peripheral portion of the fin extending outwardly of and surrounding the cavity, means to introduce air under pressure into the cavity, and a cooperating rigid receptacle portion adapted to receive the support and form an enclosure to shape the baked material, the cooperating receptacle portion being formed with a longitudinal groove spaced from and adjacent one longitudinal edge of the fin when the receptacle portions are assembled to form a hinge in the baked material along one longitudinal edge thereof, the spacing between the longitudinal edge of the fin and the longitudinal groove of the cooperating receptacle portion being less than the spacing between the elongated cavity portion of the fin and the cooperating receptacle portion.

References Cited

UNITED STATES PATENTS

| 2,039,626 | 5/1936 | Raiche. | |
| 2,568,129 | 9/1951 | Morris | 18—2 XR |
| 2,850,785 | 9/1958 | Rushing | 249—66 XR |
| 2,862,232 | 12/1958 | Reketteye | 18—2 XR |
| 3,162,895 | 12/1964 | Pusch | 18—5 |

FOREIGN PATENTS 160,589    5/1905    Germany.

J. SPENCER OVERHOLSER, *Primary Examiner.*

WALTER A. SCHEEL, J. HOWARD FLINT, JR.,
*Examiners.*

S. P. FISHER, *Assistant Examiner.*